(12) United States Patent
Chen et al.

(10) Patent No.: US 10,333,952 B2
(45) Date of Patent: Jun. 25, 2019

(54) ONLINE ALERT RANKING AND ATTACK SCENARIO RECONSTRUCTION

(71) Applicant: NEC Laboratories America, Inc., Princeton, NJ (US)

(72) Inventors: Zhengzhang Chen, Princeton Junction, NJ (US); LuAn Tang, Pennington, NJ (US); Ying Lin, Seattle, WA (US); Zhichun Li, Princeton, NJ (US); Haifeng Chen, West Windsor, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 99 days.

(21) Appl. No.: 15/729,030

(22) Filed: Oct. 10, 2017

(65) Prior Publication Data

US 2018/0034836 A1 Feb. 1, 2018

Related U.S. Application Data

(63) Continuation-in-part of application No. 15/098,861, filed on Apr. 14, 2016.

(60) Provisional application No. 62/148,232, filed on Apr. 16, 2015, provisional application No. 62/407,024, filed on Oct. 12, 2016, provisional application No. 62/411,911, filed on Oct. 24, 2016.

(51) Int. Cl.
*H04L 29/06* (2006.01)
*H04L 12/24* (2006.01)

(52) U.S. Cl.
CPC .......... *H04L 63/1416* (2013.01); *H04L 41/12* (2013.01); *H04L 41/142* (2013.01); *H04L 41/145* (2013.01); *H04L 63/1425* (2013.01)

(58) Field of Classification Search
CPC ... H04L 63/1416; H04L 41/12; H04L 41/145; H04L 41/142; H04L 63/1425
See application file for complete search history.

(56) References Cited

U.S. PATENT DOCUMENTS

| | | | |
|---|---|---|---|
| 9,292,695 B1 * | 3/2016 | Bassett | G06F 21/577 |
| 9,363,149 B1 * | 6/2016 | Chauhan | G06F 16/951 |
| 2003/0093514 A1 | 5/2003 | Valdes et al. | |
| 2007/0209074 A1 | 9/2007 | Coffman | |
| 2010/0192195 A1 | 7/2010 | Dungagan et al. | |
| 2016/0065601 A1 * | 3/2016 | Gong | G06F 21/561 726/23 |

(Continued)

OTHER PUBLICATIONS

Alexander Hofmann, Online Intrusion Alert Aggregation with Generative Data Stream Modeling, IEEE Transactions on Dependable and Secure Computing, Mar.-Apr. 2011.

(Continued)

*Primary Examiner* — Darren B Schwartz
(74) *Attorney, Agent, or Firm* — Joseph Kolodka (57) ABSTRACT

Methods and systems for detecting security intrusions include detecting alerts in monitored system data. Temporal dependencies are determined between the alerts based on a prefix tree formed from the detected alerts. Content dependencies between the alerts are determined based on a distance between alerts in a graph representation of the detected alerts. The alerts are ranked based on an optimization problem that includes the temporal dependencies and the content dependencies. A security management action is performed based on the ranked alerts.

18 Claims, 7 Drawing Sheets

(56) References Cited

U.S. PATENT DOCUMENTS

| | | | |
|---|---|---|---|
| 2016/0078229 A1* | 3/2016 | Gong | G06F 21/577 |
| | | | 726/24 |
| 2016/0205122 A1* | 7/2016 | Bassett | G06F 21/577 |
| | | | 726/23 |
| 2016/0301704 A1* | 10/2016 | Hassanzadeh | H04L 63/0209 |
| 2016/0301709 A1* | 10/2016 | Hassanzadeh | H04L 63/1433 |
| 2018/0013787 A1* | 1/2018 | Jiang | H04L 29/06 |
| 2018/0359264 A1* | 12/2018 | Sweet | G06F 21/577 |

OTHER PUBLICATIONS

Wang Li, Attack scenario construction with a new sequential mining technique, Eighth ACIS International Conference on Software Engineering, Artificial Intelligence, Networking, and Parallel/Distributed Computing, Jul.-Aug. 2007, pp. 872-877.

Oliver Dain, Fusing a Heterogeneous Alert Stream into Scenarios, In Proceedings of the 2001 ACM workshop on Data Mining for Security Applications, Dec. 18, 2001.

* cited by examiner

ONLINE ALERT RANKING AND ATTACK SCENARIO RECONSTRUCTION

RELATED APPLICATION INFORMATION

This application is a continuation-in-part of co-pending application Ser. No. 15/098,861, filed on Apr. 14, 2016, which in turn claims priority to provisional application Ser. No. 62/148,232, filed on Apr. 16, 2015, both of which are incorporated herein by reference in their entirety. This application further claims priority to provisional application Ser. No. 62/407,024, filed on Oct. 12, 2016, and 62/411,911, filed on Oct. 24, 2016, both of which are incorporated herein in their entirety.

BACKGROUND

Technical Field

The present invention relates to computer and network security and, more particularly, to alert ranking and attack scenarios reconstruction for anomaly detection.

Description of the Related Art

Enterprise networks are key systems in corporations and they carry the vast majority of mission-critical information. As a result of their importance, these networks are often the targets of attack. Communications on enterprise networks are therefore frequently monitored and analyzed to detect anomalous network communication as a step toward detecting attacks.

In particular, advanced persistent threat (APT) attacks, which persistently use multiple complex phases to penetrate a targeted network and steal confidential information, have become major threats to enterprise information systems. Existing rule/feature-based approaches for APT detection may only discover isolated phases of an attack. As a result, these approaches may suffer from a high false-positive rate and cannot provide a high-level picture of the whole attack.

In such enterprise networks, multiple detectors may be deployed to monitor computers and other devices. These detectors generate different kinds of alerts based on the monitored data. Reconstructing attack scenarios involves determining which ranks are important and which represent false positives.

SUMMARY

A method for detecting security intrusions includes detecting alerts in monitored system data. Temporal dependencies are determined between the alerts based on a prefix tree formed from the detected alerts. Content dependencies between the alerts are determined based on a distance between alerts in a graph representation of the detected alerts. The alerts are ranked, using a processor, based on an optimization problem that includes the temporal dependencies and the content dependencies. A security management action is performed based on the ranked alerts.

A system for detecting security intrusions includes a detector module configured to detect alerts in monitored system data. A temporal dependency module is configured to determine temporal dependencies between the alerts based on a prefix tree formed from the detected alerts. A content dependency module is configured to determine content dependencies between the alerts based on a distance between alerts in a graph representation of the detected alerts. A ranking module includes a processor configured to rank the alerts based on an optimization problem that includes the temporal dependencies and the content dependencies. A security module is configured to perform a security management action based on the ranked alerts.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, the present embodiments provide alert ranking, discover the underlying correlations between different alerts, and reconstruct attack scenarios. The present alert ranking therefore addresses the challenges presented by alert heterogeneity, temporal and content differences, false positives, the need for real-time responsiveness, a lack of training data, and non-linear alert correlations.

Figure 1:
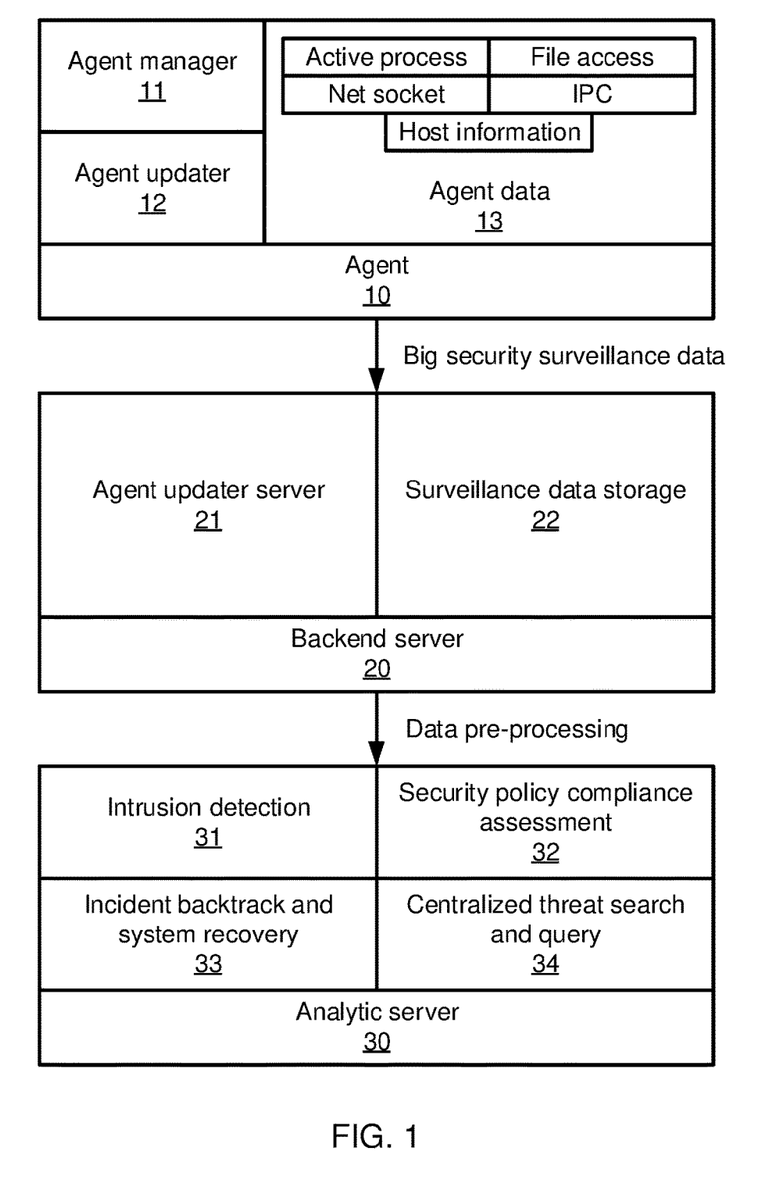
FIG. 1 is a block/flow diagram directed to an automatic security intelligence system architecture in accordance with an embodiment of the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
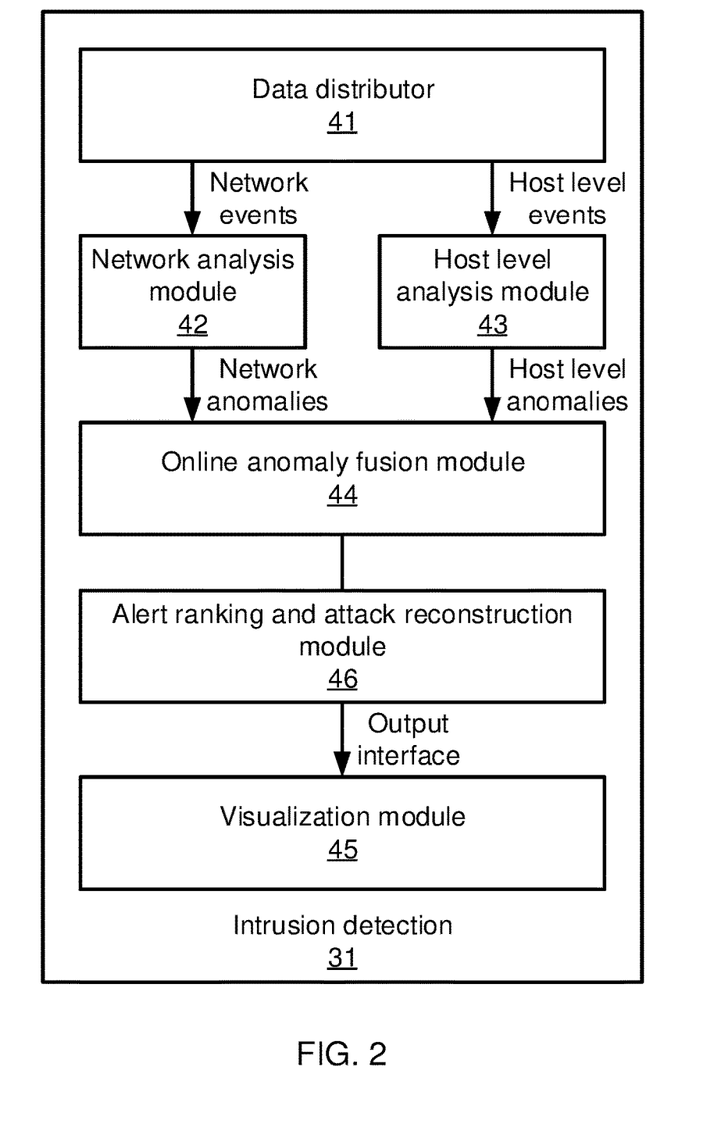
FIG. 2 is a block/flow diagram directed to an intrusion detection engine architecture in accordance with an embodiment of the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; anomaly fusion module 44 that integrates network level anomalies and host level anomalies and refines the results for trustworthy intrusion events; alert ranking and attack scenario reconstruction module 46 that uses both temporal and content correlations to rank alerts and reconstruct attack scenarios; and visualization module 45 that outputs the detection results to end users.

The detectors that feed the intrusion detection system 31 may report alerts with very different semantics. For example, network detectors monitor the topology of network connections and report an alert if a suspicious client suddenly connects to a stable server. Meanwhile, process-file detectors may generate an alert if an unseen process accesses a sensitive file. The intrusion detection system 31 integrates alerts regardless of their respective semantics to overcome the problem of heterogeneity.

Furthermore, real security incidents (e.g., hacker attacks, malware infections, etc.) are likely to cause multiple alerts for different detectors. However, particularly in an advanced persistent threat (APT) scenario, the alerts might be widely spaced in time, with heterogeneous system entity information. The alert ranking and attack scenario reconstruction module 46 therefore integrates alerts with both temporal and content differences.

Due to the complexity of enterprise systems, the accuracy of a single detector is usually low, where the majority of alerts being generated are false positives. The false positives are therefore filtered out, with only meaningful ranking results being output. Furthermore, this processing takes place in real-time to address the high potential for damage that can develop rapidly.

Because of the large scale of data collection in enterprise systems, it can be difficult to obtain useful training data for an analysis system. The manual labeling of large sets of reported alerts to create training data is costly and error-prone. Furthermore, most real alerts are unknown attacks, where the end user has no knowledge about the alert pattern and cannot define a useful model in advance. As such, the present embodiments learn models to detect attacks as the attacks unfold.

APT attacks usually include a series of sequential, interacting process events. Such non-linear cooperative interactions between system events can often generate sequences or patterns of alerts. As a result, the present embodiments discover the underlying relationship between different alerts and rank the alerts based on interactions between the processes.

Figure 3:
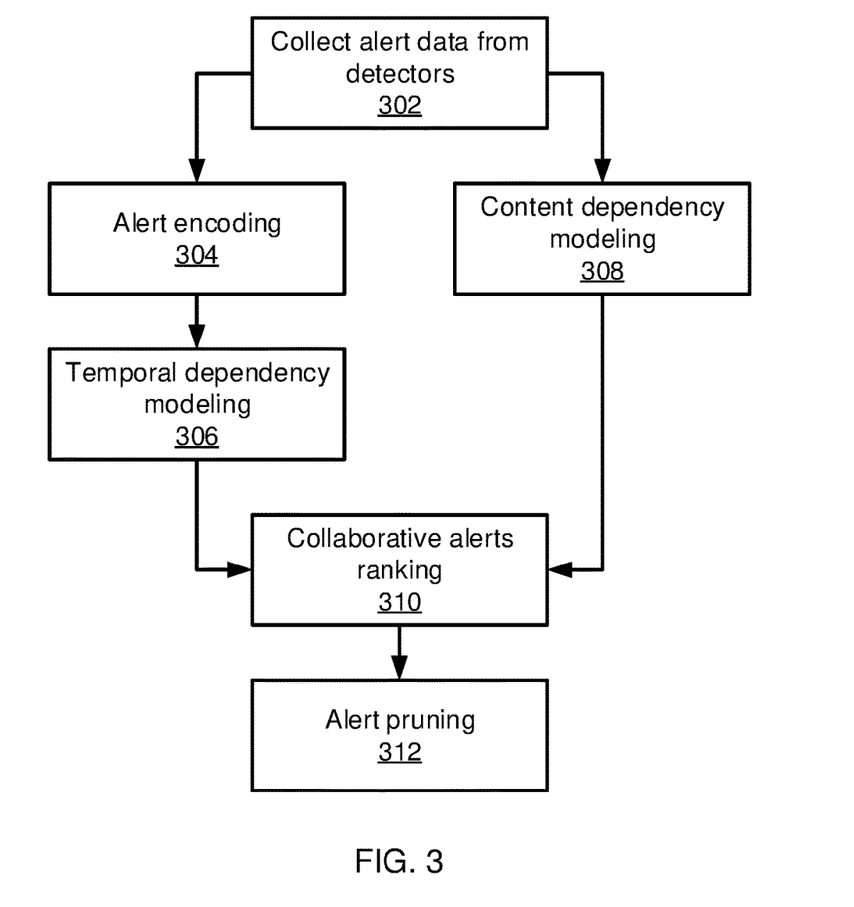
FIG. 3 is a block/flow diagram of a method of tracking the dependencies between alerts and pruning the alerts in accordance with an embodiment of the present principles.

Referring now to FIG. 3, additional detail is shown for the alert ranking and attack scenario reconstruction module 46. A collaborative alert ranking (CAR) engine discovers the trustworthy alerts and corresponding attack patterns for a large enterprise security system. Block 302 collects alert data from a set of heterogeneous detectors across an enterprise network. Although enterprise networks and a correspondingly large number of detectors are specifically contemplated herein, it should be understood that the present embodiments also apply to smaller networks with relatively few, homogeneous detectors.

Block 304 performs alert encoding. Alert encoding determines the raw alert sequence under an appropriate granularity. Each alert may be considered unique if all attributes are considered, making it difficult to capture the temporal dependency between alerts. However, because each alert can be represented as the co-occurrence of a set of entities when the time-related attribute is excluded, a set of representatives, $\Sigma$, is used to create ensembles of co-occurrences. The number of representatives can be too large to be manipulated if all non-time-related entities are considered. As such, only important entities are considered, with examples including the source and destination entities representing each alert. Block 304 enumerates all possible alerts in the symbol set $\Sigma$.

Block 306 then performs temporal dependency modeling on the alerts. To model temporal dependency in alert sequences, a prefix tree is used to preserve the temporal structure between alerts and to learn the long-term dependencies between alerts using Bayesian hierarchical modeling. Block 306 then applies a breadth-first search on the prefix tree to identify a set of patterns such that alerts in each pattern are highly correlated.

Block 308 performs content dependency modeling, either before, during, or after the temporal dependency modeling of block 306. Each alert is associated with heterogeneous types of entities, such as the user, time, source/destination process, and folder. These entities, viewed as content information, are useful for aggregating low-level alerts into a high-level view of an attacker's behavior.

Block 310 then performs ranking based on both the temporal structures and content similarities determined by blocks 306 and 308, identifying alerts and alert patterns that maximize the consensus between temporal and content dependencies. It should be noted that an alert pattern is a sequence of alerts that may represent multiple steps or phases of an abnormal system or user activity. Block 310 sorts the confidences of alerts and alert patterns simultaneously by integrating the temporal and content dependencies into an optimization problem. The output of block 310 is a set of ranked alerts. Block 312 then prunes the untrustworthy alerts and alert patterns by, e.g., removing alerts and alert patterns having a confidence score below a threshold value or having a rank below a threshold rank.

Figure 4:
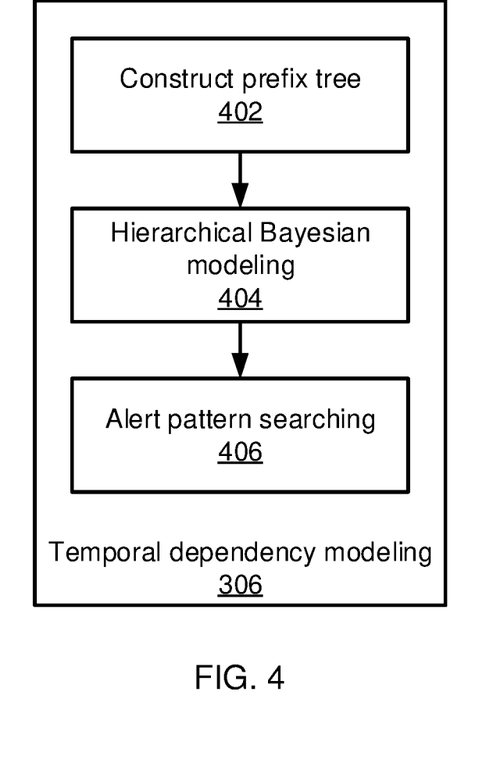
FIG. 4 is a block/flow diagram of temporal dependency modeling in accordance with an embodiment of the present principles.

Referring now to FIG. 4, additional detail is provided on the temporal dependency modeling of block 306. Existing approaches to modeling the temporal dependency of discrete, sequential data, such as random walk models, Markov models, n-gram models, and association rules, characterize a sequence in terms of a set of conditional distributions that describe the dependence of future symbols on a finite history of symbols. As a result, these approaches only capture the finite, or short-term, dependencies between symbols. However, multi-step attacks may conduct their attacks in intermittent increments over a long period of time to avoid detection. Thus, the present embodiments model each symbol of a sequence using a predictive distribution that is conditional on all previous symbols.

A sequence of alerts is formally expressed herein as $s_{1:T} = \{S_1, \ldots, S_T\}$, where each $s_i$ takes a value in the set of entities $\Sigma$. The joint distribution over the sequence can be estimated by:

$$p(s_{1:T}) = \prod_{i=1}^{T} p(s_i | s_{1:i-1})$$

where the prediction of symbol $s_i$ is conditioned on all of its preceding symbols $s_{1:i-1}$. When the prediction of the next variable is only related to the values taken by at most the preceding n variables, this problem can be approximated by an $n^{th}$ order Markov model. When n is not truncated to some fixed value, the model is non-Markovian.

To learn such a model from the data, a predictive distribution of the next symbol, given each possible context, is learned. Given a finite sequence of symbols s, the predictive distribution of the next symbol conditioned on s is written as $G_{[s]}$. $G_{[s]}$ is a discrete distribution that can be represented as a probability vector with latent variables: $G_{[s]}(u)=p(s_{T+1}=u|s)$, $\forall u \in \Sigma$.

Estimating probability vectors independently relies on adequate training sequences that represent the true distribution. However, because attack scenarios are rate and have a low recurrence or signal observation, it is difficult to estimate a whole probability vector that generalizes in any reasonable way. Block 402 therefore creates a prefix tree representation that hierarchically ties together the vector of predictive probabilities in a particular context to vectors of probabilities in related, shorter contexts. Block 404 then builds a hierarchical Bayesian model to address the problem of insufficient training data, using observations that occur in very long contexts to recursively inform the estimation of the predictive probabilities for related, shorter contexts and vice versa. Block 406 then searches for attack patterns.

For a given sequence s having T symbols, the number of predictive distributions conditioned on a context can be intractable when the length T goes to infinity. The only variables that will have observations associated with them are the ones corresponding to the contexts that are prefixes of s:

$$\{G_{[s']}\}_{s' \in \{s_{1:i}|1 \le i \le T\}}.$$

The prefix tree representation created by block 402 therefore includes a set of nodes that represent a prefix (e.g., a sequence of nodes) and its probability vector. Each node depends only on its ancestors in the prefix tree, which correspond to the suffices of the context. Thus, the only variables for which inference is needed are precisely those that correspond to contexts which are contiguous subsequences of s:

$$\{G_{[s_{j:i}]}\}_{1 \le i \le T}.$$

The prefix tree representation of a sequence may be constructed from an input string in $O(T^2)$ time and space. The prefix tree representation can further be improved by marginalizing out the on-branching interior nodes. The marginalized prefix tree can also be directly built from an input sequence in linear time and space complexity. The resulting prefix tree retains the nodes (variables) of interest, eliminating all non-branching nodes by allowing each edge label to be a sequence of symbols (or meta-symbols), rather than a single symbol.

Block 404 uses a hierarchical Bayesian model to approximate the probability vectors in the prefix tree generated by block 402, based on the assumption that predictive distributions conditioned on similar preceding contexts will be similar. A hierarchical Bayesian prior is placed over the set of probability vectors. The prior probability vector for $G_{[s]}$ is written herein as $H_{[s]}$. Before observing any data, the next symbol conditioned on s should occur according to the probability $H_{[s]}(u)$, $\forall u \in \Sigma$. The hierarchical Bayesian priors regard the distribution on each node as prior to inform the distributions on its descendants. The hierarchical structure can be expressed as $H_{[s]}=G_{[\pi(s)]}$, where $\pi(s)$ denotes the suffix of s having all but the earliest symbol, corresponding to the parent of node s in the prefix tree. A Pitman-Yor process is then applied to capture the hierarchical structure.

Based on the predictive distributions learned by the Bayesian hierarchical modeling of block 404, block 406 finds a set of highly correlated alert patterns. Given an alert pattern of length L, denoted herein as $u=\{s_{u_1}, \ldots, s_{u_L}\}$, the probability of observing this pattern conditioned on the alert sequence $s_{1:T}$ can be predicted as:

$$P(u|s_{1:T}) = \prod_{i=1}^{L} p(s_{u_i}|s_{1:T}, s_{u_1}, \ldots, s_{u_{i-1}})$$

The more likely a pattern is to be observed in the sequence, the stronger the temporal dependency of the pattern is. To identify the set of patterns that have probability larger than a threshold $\varepsilon$ and an arbitrary length smaller than $L_{max}$ from the Bayesian hierarchical modeling, block 406 uses a breadth-first search to find alert patterns on the prefix tree.

Figure 5:
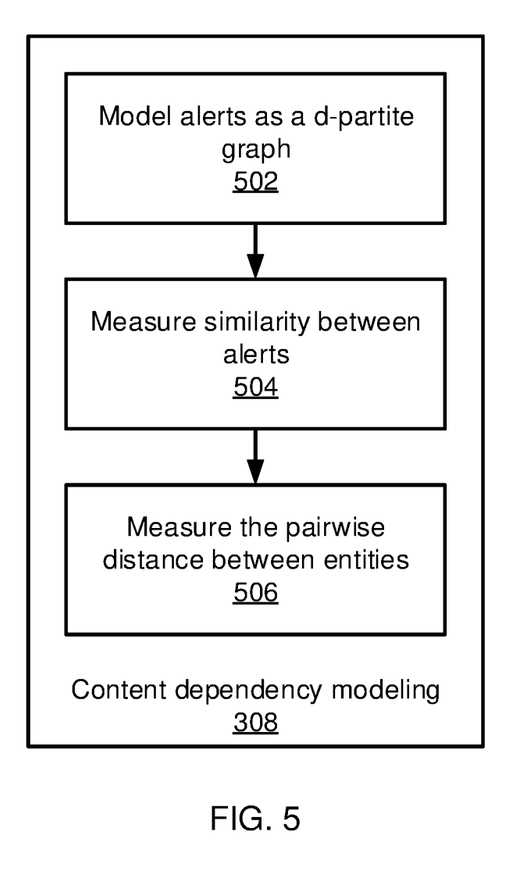
FIG. 5 is a block/flow diagram of content dependency modeling in accordance with an embodiment of the present principles.

Referring now to FIG. 5, additional detail on the content dependency modeling of block 308 is shown. Each alert is associated with d entities coming from d types, with entities in the $j^{th}$ type being written herein as $V_j$, where $|V_j|=c_j$, the number of different entities of the $j^{th}$ type. V is the set of all entities: $V=U_{j=1}^{d}V_j$, with the magnitude of V being written as: $|V|=\Sigma_{j=1}^{d}c_j$. Block 308 captures the distance between each pair of entities and represents the dependency between alerts as the overall distance between their entities.

In particular, the entities of a $k^{th}$ type in alert i and alert k are written as $v_{ik}$ and $v_{jk}$, respectively, each of which is a member of $V_k$. The distance between the two entities is written as $dis(v_{ik}, v_{jk})$. The distance between alerts, $dis(a_i, a_j)$ can be naturally derived from the convention of the $L_\theta$-norm distance, which is the sum of the $L_\theta$ distance along each dimension:

$$dis(a_i, a_j)^\theta = \sum_{k=1}^{d} dis(v_{ik}, v_{jk})^\theta$$

In practice, the $\theta$ is always specified at 1 and 2, which resemble the Hamming and Euclidean distances, respectively. Since the dependent alerts always occur within a certain time span, a time decay function can be further incorporated into the distance measurements. The times of occurrence for alerts $a_i$ and $a_j$ are written herein as $t_i$ and $t_j$, with the time difference between them being $\Delta t = |t_i - t_j|$. When the time difference between two alerts is greater than a threshold $\delta$, the dependency decays exponentially with $\Delta t$. Otherwise the dependency does not decay. Thus:

$$dis(a_i, a_j)^\theta = e^{c_2 \delta(\Delta t)} \sum_{k=1}^{d} dis(v_{ik}, v_{jk})^\theta$$

where $c_2$ is a constant that controls the decay rate and where:

$$\delta(t) = \begin{cases} 0 & \text{if } t \leq \delta \\ 1 & \text{if } t > \delta \end{cases} \quad 5$$

This reduces the problem to finding the distance between each pair of entities. Due to the fact that categorical data does not have any intrinsic distance measurement, the co-occurrence has been widely used to quantify the relationship between entities. The co-occurrence measures the closeness of entities by the frequency of their co-occurrence, but is limited by its intransitive nature. For example, if the entities a and b do not occur, based on the co-occurrence statistics they are not close to one another. However, if both a and b are indirectly connected by the entity c, they would share a certain degree of similarity. This similarity would be missed because a and b didn't co-occur in the alert data.

To measure the dependency between alerts, the present embodiments also capture the transitive distance between entities. Block 502 therefore creates a d-partite graph G=(V, E), with the vertex set V being made up of all entities and the edge set E indicating the co-occurrence structure among the entities. The graph is a d-partite graph with each partite representing a type of entities, because entities belonging to the same type do not co-occur in the alert data.

Based on the graph representation, block 504 measures the similarity between alerts and block 506 measures the pairwise distance between entities using a proximity measures approach, which provides a systematic way to augment the initial entity relation by collectively considering an entity's relation with other entities. Entities of the same type can then be related to one another by transiting their connection with entities of other types.

Block 502 represents each node in the graph as a vector of 1s and 0s, with each element recording the occurrence of the $i^{th}$ entity in all alerts, denoted as $v_i \in \mathbb{R}^{T \times 1}$. Based on the vector representation, the weights are estimated using the proximities listed in table 1 below. The similarity measurements need to be further transformed to a distance using transfer functions to obtain the shortest-path distance.

When the similarity is non-zero, the transfer function may take the form of, e.g., $$f(x) = 1, \; f(x) = \frac{1}{x}, \; f(x) = -\log(x)$$

etc., and may be infinite when the similarity is zero. Considering all co-occurrences may result in a dense, noisy graph, so block 502 prunes the noisy edges by removing connections that are not within the k nearest neighbors, where k is a parameter that controls the sparsity of the graph. The distance between any pair of entities can be directly computed from some proximity measures, such as the Hamming and Euclidean distances, where entities with zero occurrence can still have some finite distance between them. These measures can also be less robust, however, because the distance measure they provide is intransitive and may not faithfully reflect the proximities between entities. By only connecting correlated entities and then using the shortest path to link less-correlated entities, a more robust proximity measure is achieved.

By sorting all entities with a certain order, the pairwise distances between the entities can be represented as a θ-norm symbolic distance matrix, $S^\theta$, with each element $S_{pq}^\theta$ representing the distance between $v_{(p)}$ and $v_{(q)}$: $S_{pq}^\theta = \text{dis}(v_{(p)}, v_{(q)})^\theta$, where θ is a power parameter. Using the distance measurement and the transfer function of similarity, a pairwise similarity matrix between alerts is generated by block 502 and is denoted as S.

Having the temporal and content dependencies from blocks 306 and 308, block 310 ranks the alerts. The set of alert patterns extracted from the temporal model are denoted as $M_1, \ldots, M_L$ with corresponding anomaly scores $p_1, \ldots, p_L$. Each alert pattern $M_l$ is associated with a set of processes $$S_{a_i} \in \{s_{l_1}, \ldots, s_{l_{M_l}}\},$$

The pattern structures among alerts are given by an affinity matrix $F \in \mathbb{R}^{\mathbb{T} \times \mathbb{L}}$, where $\mathbb{T}$ is the number of alerts and L is the number of patterns. Each element of the affinity matrix,

| | Proximity | Connected edge | Non-connected edge |
|---|---|---|---|
| Similartiy | Co-occurrence | $\|v_p \cap v_q\|$ | 0 |
| | Normalized co-occurence | $\dfrac{\|v_p \cap v_q\|}{\|v_p \cup v_q\|}$ | 0 |
| | Mutual information | $\displaystyle\sum_{e,\tilde{e}\in\{0,1\}} p(v_p = e, v_q = \tilde{e}) \times \log\left(\dfrac{p(v_p = e, v_q = \tilde{e})}{p(v_p = e)p(v_q = \tilde{e})}\right)$ | 0 |
| Distance | Hamming distance | $\|v_p - v_q\|$ | $+\infty$ |
| | Euclidean distance | $\|v_p - v_q\|_2$ | $+\infty$ |
| | Cosine distance | $\arccos\left(\dfrac{v_p' v_q}{\sqrt{\|v_p\| \|v_q\|}}\right)$ | $+\infty$ |

$F_{il}$, indicates whether an alert $a_i$ is included in the pattern $M_l$. The value of $F_{il}$ is 1 if the process conducting $a_i$ exists in pattern $M_l$:

$$M_l = \{s_{l_1}, \ldots, s_{l_{|M_l|}}\}.$$

and is 0 otherwise.

Each alert can either correspond to a true intrusion or to a false positive. The probability of each alert $a_i$ (with i=1, . . . , T) corresponding to a true intrusion is $\hat{P}(a_i$=true positive). As noted above, T is the number of symbols in a training sequence, where the number of symbols in the sequence is the same as the number of all alerts. The number of unique symbols and the number of unique alerts would be different, because symbols are used to represent the alerts based on the values of some important entities of the alert, such that different alerts can have the same symbol.

Block 310 ranks alerts based on these estimated probabilities. Each alert $a_i$ is therefore assigned a score $u_i$ that represents the probability of being a true positive. Due to the presence of false positives, each alert pattern $M_l$ may be a mixture of true positives and false positives that does not correspond to intrusion behavior. The confidence for each alert pattern being an intrusion, $P(M_l$=true positive), is assigned to a score $v_l$. Therefore, maximizing the consensus between temporal and content dependencies is equivalent to estimating the scores of alerts and alert patterns that satisfy the following conditions:

1. The score of each alert pattern is correlated to the pattern's anomaly score.
2. The score of each alert pattern depends on the probabilities of its associated alerts being true positives.
3. Similar alerts tend to have similar probabilities of being true positives.

The optimization problem solved by block 310 therefore estimates the confidence of alerts and alert patterns based on their anomaly scores and incorporates the content and temporal structures:

$$\min_{v,u} -\sum_l p_l v_l + \frac{\lambda_1}{2} \sum_{i,l} F_{il}(v_l - v_i)^2 + \frac{\lambda_2}{2} \sum_{i,j} S_{ij}(u_i - u_j)^2$$

$$\text{s.t.} \sum_i u_i \leq K, v_l \geq 0, 0 \leq u_i \leq 1$$

where the first term of the objective function maximizes the correlation between confidence of alert patterns and their anomaly scores and the second and third part provide two regularizations that control similarities between the scores over temporal and content structures. The second term ensures closeness from each alert pattern to its associated alerts and the third term incorporates the alerts' similarity estimated from content dependency modeling as the similarity matrix S to regularize the deviation between alert probabilities. The parameters $\lambda_1$ and $\lambda_2$ are tuning parameters that control the degree to which probability vectors are similar. Larger values for the tuning parameters impose a stronger regularization effect on the estimate. The first constraint is imposed to control the number of true positive alerts in solutions having larger values for K, indicating more true positives. K is a pre-defined integer that roughly controls the number of alerts with non-zero scores in the constraint. The remaining constraints are added to ensure the non-negativity and normalization of parameters.

Block 310 solves this optimization problem using, e.g., quadratic programming. The top-k alerts and alert patterns are those having the top-k values for v and u. Block 312 removes any alerts and alert patterns that are not within the top-k.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
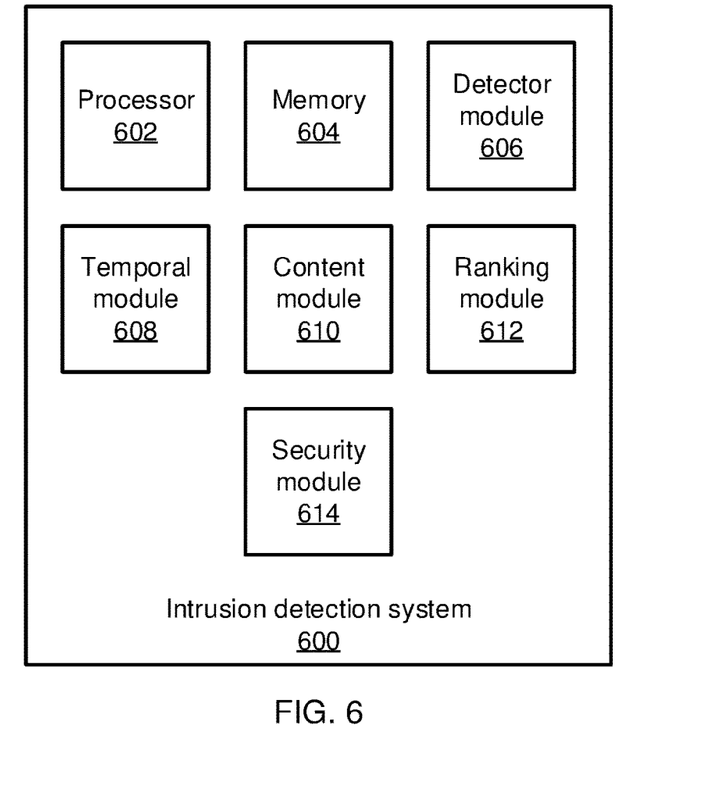
FIG. 6 is a block diagram of a system for detection intrusions in accordance with an embodiment of the present principles.

Referring now to FIG. 6, an intrusion detection system 600 is shown. The intrusion detection system 600 includes a hardware processor 602 and a memory 604. The system 600 further includes one or more functional modules that, in some embodiments, may be implemented as software that is stored in memory 604 and is executed by hardware processor 602. In other embodiments, the functional modules may be implemented as one or more discrete hardware components in the form of, e.g., application specific integrated chips or field programmable gate arrays.

A detector module 606 interfaces with the detectors in the enterprise system, collecting alert information from every detector and storing the alert information in the memory 604. The temporal dependency module 608 and the content dependency module 610 process the stored alert information to identify the dependencies between the various heterogeneous alerts so that ranking module 612 can determine which alerts and alert patterns are trustworthy and represent true positives.

Based on the outcome of the ranking module 612, a security module 614 performs manual or automated security actions in response to the ranked alerts and alert patterns. In particular, the security module 614 may have rules and policies that trigger when alerts indicate certain kinds of attacker behavior. Upon such triggers, the security module 614 may automatically trigger security management actions such as, e.g., shutting down devices, stopping or restricting certain types of network communication, raising alerts to system administrators, changing a security policy level, and so forth. The security module 614 may also accept instructions from a human operator to manually trigger certain security actions in view of analysis of the alerts and alert patterns.

Figure 7:
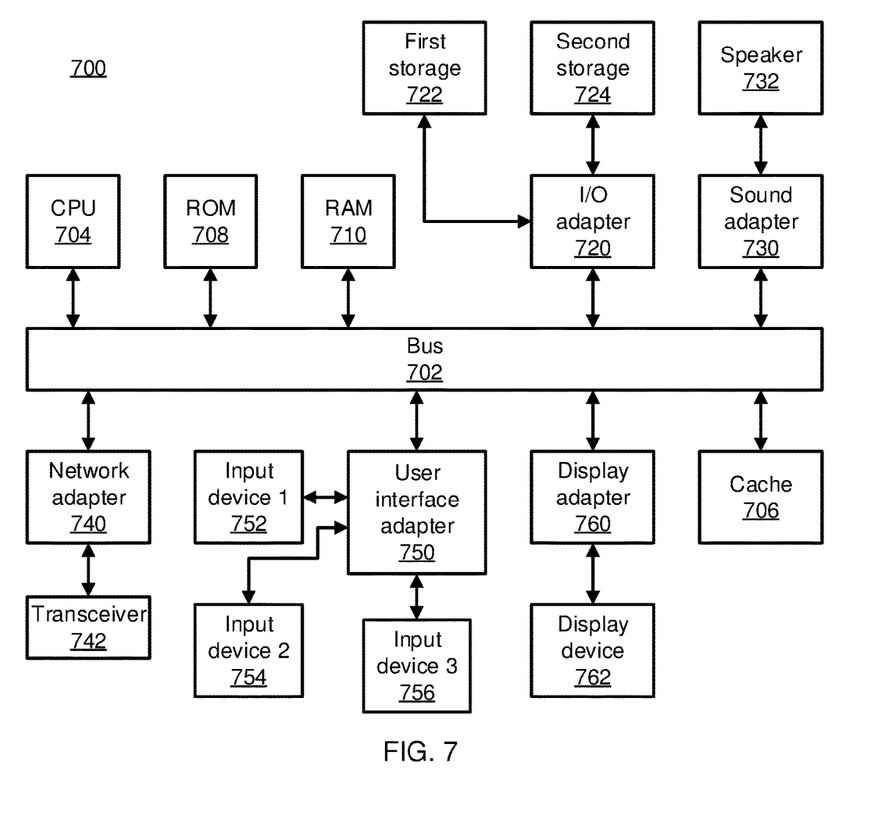
FIG. 7 is a block diagram of a processing system in accordance with an embodiment of the present principles.

Referring now to FIG. 7, an exemplary processing system 700 is shown which may represent the intrusion detection system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting security intrusions, comprising:
   detecting alerts in monitored system data;
   determining temporal dependencies between the alerts based on a prefix tree formed from the detected alerts;
   determining content dependencies between the alerts based on a distance between alerts in a graph representation of the detected alerts;
   ranking the alerts, using a processor, based on a solution of an optimization problem that includes the temporal dependencies and the content dependencies; and
   performing a security management action based on the ranked alerts.

2. The method of claim 1, wherein determining the temporal dependencies between alerts comprises generating the prefix tree as a set of nodes that each represent a sequence of alerts and a respective probability vector.

3. The method of claim 2, wherein determining temporal dependencies comprises determining the probability vector of each node in the prefix tree using a hierarchical Bayesian model.

4. The method of claim 1, wherein determining temporal dependencies comprises performing a breadth-first search of the prefix tree to identify a set of patterns such that alerts in each pattern are highly correlated.

5. The method of claim 1, wherein determining content dependencies comprises modeling the alerts as a d-partite graph, where each partite corresponds to a different entity type for entities associated with the alerts.

6. The method of claim 5, wherein each node of the graph represents an entity and wherein each edge of the graph represents a co-occurrence between the connected entities.

7. The method of claim 1, wherein the optimization problem comprises a first term that maximizes a correlation between a confidence of alert patterns and respective anomaly scores, a second term that provides closeness from each alert pattern to its associated alerts, and a third term that incorporates a similarity matrix to regularize a deviation between alert probabilities.

8. The method of claim 1, further comprising pruning ranked alerts having a rank lower than a threshold rank before performing the security management action.

9. The method of claim 1, wherein performing the security action further comprises automatically performing at least one security action selected from the group consisting of shutting down devices, stopping or restricting certain types of network communication, raising alerts to system administrators, and changing a security policy level.

10. A system for detecting security intrusions, comprising:
- a detector module configured to detect alerts in monitored system data;
- a temporal dependency module configured to determine temporal dependencies between the alerts based on a prefix tree formed from the detected alerts;
- a content dependency module configured to determine content dependencies between the alerts based on a distance between alerts in a graph representation of the detected alerts;
- a ranking module comprising a processor configured to rank the alerts based on a solution to an optimization problem that includes the temporal dependencies and the content dependencies; and
- a security module configured to perform a security management action based on the ranked alerts.

11. The system of claim 10, wherein the temporal dependency module is further configured to generate the prefix tree as a set of nodes that each represent a sequence of alerts and a respective probability vector.

12. The system of claim 11, wherein the temporal dependency module is further configured to determine the probability vector of each node in the prefix tree using a hierarchical Bayesian model.

13. The system of claim 10, wherein the temporal dependency module is further configured to perform a breadth-first search of the prefix tree to identify a set of patterns such that alerts in each pattern are highly correlated.

14. The system of claim 10, wherein the content dependency module is further configured to model the alerts as a d-partite graph, where each partite corresponds to a different entity type for entities associated with the alerts.

15. The system of claim 14, wherein each node of the graph represents an entity and wherein each edge of the graph represents a co-occurrence between the connected entities.

16. The system of claim 10, wherein the optimization problem comprises a first term that maximizes a correlation between a confidence of alert patterns and respective anomaly scores, a second term that provides closeness from each alert pattern to its associated alerts, and a third term that incorporates a similarity matrix to regularize a deviation between alert probabilities.

17. The system of claim 10, further wherein the ranking module is further configured to prune ranked alerts having a rank lower than a threshold rank before performing the security management action.

18. The system of claim 10, wherein the security module is further configured to automatically perform at least one security action selected from the group consisting of shutting down devices, stopping or restricting certain types of network communication, raising alerts to system administrators, and changing a security policy level.

* * * * *